US009355754B2

(12) United States Patent
Hong et al.

(10) Patent No.: US 9,355,754 B2
(45) Date of Patent: May 31, 2016

(54) ELECTROCONDUCTIVE POLYAMIDE/POLYPHENYLENE ETHER RESIN COMPOSITION AND MOLDED PRODUCT FOR VEHICLE USING THE SAME

(71) Applicant: Samsung SDI Co., Ltd., Yongin-si (KR)

(72) Inventors: Chang Min Hong, Uiwang-si (KR); Doo Young Kim, Uiwang-si (KR); Wonyoung Choi, Uiwang-si (KR); Jung Hun Lee, Uiwang-si (KR); Jin-Kyung Cho, Uiwang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/585,391

(22) Filed: Dec. 30, 2014

(65) Prior Publication Data

US 2015/0187458 A1 Jul. 2, 2015

(30) Foreign Application Priority Data

Dec. 30, 2013 (KR) ........................ 10-2013-0166902

(51) Int. Cl.
*H01B 1/24* (2006.01)
*C08L 77/00* (2006.01)

(52) U.S. Cl.
CPC ........................................ *H01B 1/24* (2013.01)

(58) Field of Classification Search
CPC ........... D02G 3/00; C08L 77/06; C08L 77/02; B29C 47/00
USPC ......... 252/511; 428/373; 525/420; 264/176.1
See application file for complete search history.

(56) References Cited

U.S. PATENT DOCUMENTS

| | | | | |
|---|---|---|---|---|
| 5,643,502 | A * | 7/1997 | Nahass et al. | 252/511 |
| 5,741,846 | A | 4/1998 | Lohmeijer et al. | |
| 6,479,030 | B1 * | 11/2002 | Firsich | C04B 38/0022 423/447.1 |
| 2002/0115778 | A1 * | 8/2002 | Koevoets et al. | 524/451 |

FOREIGN PATENT DOCUMENTS

| | | | |
|---|---|---|---|
| EP | 0506386 | A2 | 9/1992 |
| EP | 0685527 | B1 | 3/1997 |
| JP | 2756548 | A | 8/1990 |
| JP | 04-300956 | A | 10/1992 |

* cited by examiner

*Primary Examiner* — Mark Kopec
*Assistant Examiner* — Danny N Kang
(74) *Attorney, Agent, or Firm* — Additon, Higgins & Pendleton, P.A.

(57) ABSTRACT

An electroconductive polyamide/polyphenylene ether resin composition and a molded product for vehicle manufactured using the same includes a base resin (a) including polyphenylene ether (a-1) and polyamide (a-2); an impact modifier (b); a compatibilizer (c); and an electroconductive filler (d). The electroconductive filler (d) includes aromatic compounds having molecular weights of about 120 to about 1,000 g/mol, wherein the aromatic compounds are byproducts generated when preparing the electroconductive filler (d).

14 Claims, No Drawings

ELECTROCONDUCTIVE POLYAMIDE/POLYPHENYLENE ETHER RESIN COMPOSITION AND MOLDED PRODUCT FOR VEHICLE USING THE SAME

CROSS-REFERENCE TO RELATED APPLICATION

This application claims the benefit of priority under 35 U.S.C. §119(a) of Korean Patent Application No. 10-2013-0166902, filed on Dec. 30, 2013, in the Korean Intellectual Property Office, the entire disclosure of which is incorporated herein by reference for all purposes.

FIELD OF THE INVENTION

Various embodiments of the present invention relate to an electroconductive polyamide/polyphenylene ether resin composition and a molded product for vehicle manufactured from the same.

BACKGROUND

Plastic materials have low thermal resistance and flame resistance compared to metal or ceramic materials, but they have advantages such as lightness, design flexibility, and moldability, and thus are widely used in materials for a variety of products, from household items to industrial areas including automobiles and electrical and electronic products.

There are various types of plastic materials, from commodity plastics to engineering plastics that are widely used in areas that need various functions and performance characteristics.

Of these plastic materials, polyphenylene ether resin has excellent electrical and mechanical properties, and also a high heat deflection temperature. Thus, polyphenylene ether resins are widely used as engineering plastic materials in various areas.

Polyphenylene ether resin was developed by General Electric Co. in the USA. Based on its excellent thermal resistance, polyphenylene ether resin is becoming a useful industrial material that is mainly used as a blend with high impact polystyrene. More recently, polyphenylene ether resin is being employed in the form of alloys such as polyamide/polyphenylene ether resin alloys compatibilized by a reactive extrusion method, that is, a method for compatibilizing an incompatible blend, and polypropylene/polyphenylene ether resin alloys prepared by adding a compatibilizer as a third substance.

Disadvantages of polyamide/polyphenylene ether resin alloys have been compensated for effectively, so that the alloys can have a good balance of thermal resistance, impact resistance, and chemical resistance. Thus, polyamide/polyphenylene ether resin alloys are being employed in automobile components such as wheel caps, junction boxes, and under-the-hood components.

Recently, there has been a need for materials that can be used in plastic exterior components by electrostatic online painting simultaneously with other metal material components. See, for example, EP 685527 B1 to General Electric Co., directed to an electroconductive polyamide/polyphenylene ether resin alloy used in automobile fender components.

Development of a polyamide/polyphenylene ether resin alloys having electroconductivity enabled electrostatic painting to be performed simultaneously with other metal components, without a need for an additional painting process, thus saving production costs.

As a way to embody electroconductivity in polyamide/polyphenylene ether resin alloys, a method of adding an electroconductive filler such as carbon fiber or carbon black was proposed. See, for example, JP H04-300956 A. However, carbon fiber deteriorates the moldability of products, and when using a conventional carbon black, carbon black has to be added in large amounts in order to achieve the electroconductivity necessary for application to electrostatic painting. Either case may result in insufficient impact resistance and moldability.

To resolve this problem of impact resistance and moldability, a nano unit carbon fiber (carbon fibril) and electroconductive carbon black with an adjusted size have been used, but there occurred a problem of reduced compatibility between polyamide and polyphenylene ether. See, for example, JP 2756548 B2.

To resolve the aforementioned problem of reduced compatibility while producing a polyamide/polyphenylene ether resin alloy having excellent properties, it is important that a compatibilization reaction proceeds smoothly between polyphenylene ether, polyamide, and a compatibilizer.

In this regard, a conventional method of compatibilizing polyamide and polyphenylene ether first, and then adding an electroconductive carbon black therein was disclosed. See, for example, EP 685527 B1.

However, according to this method, polyamide/polyphenylene ether resin alloy, compatibilizer and other additives must be added in a particular adding order using a special extrusion processing equipment with a plurality of side feeders installed therein. This is uneconomical due to high investment costs, and further, the restrictive order of adding the materials decreases productivity.

Furthermore, methods of using nano size carbon fibril or carbon black have been proposed, but these methods have yet to be optimized to provide electroconductivity effectively.

Therefore, the electroconductive fillers used in conventional polyamide/polyphenylene ether resin alloys are still a problem in terms of properties and economic feasibility. Thus, there is a need to improve the efficiency of electroconductivity and to reduce the amount of electroconductive filler that should be added.

SUMMARY

Thus, in the present invention, studies were made to provide a polyamide/polyphenylene ether resin composition having improved properties and economic feasibility that uses a conductive filler with high efficiency to achieve required electroconductivity even with a smaller amount of the conductive filler than used in conventional methods, thereby reducing deterioration of properties caused by the added electroconductive filler so that the polyamide/polyphenylene ether resin composition can be applied to online electrostatic painting.

A purpose of the various embodiments of the present invention is to resolve the aforementioned problems of prior art, that is, to provide a polyamide/polyphenylene ether resin composition that may have improved properties of excellent mechanical strength, impact resistance, electroconductivity, and economic feasibility, by using a conductive filler with high efficiency to reduce deterioration of properties of the polyamide/polyphenylene resin composition, and a molded product for vehicle manufactured from the same.

Another purpose of the various embodiments of the present invention is to provide an electroconductive polyamide/polyphenylene ether resin composition wherein substances constituting the resin composition may be adjusted such that without having to mull polyphenylene ether and polyamide first and compatibilize them, even by adding an electroconductive filler to the polyphenylene ether resin composition and melting and mulling the composition prior to compatibilization, the polyamide/polyphenylene ether resin composition may have excellent mechanical strength, impact resistance, electroconductivity, productivity, and economic feasibility, and a molded product for vehicle manufactured from the same.

According to an embodiment of the present invention, there is provided an electroconductive polyamide/polyphenylene ether resin composition including: a base resin (a) including polyphenylene ether (a-1) and polyamide (a-2); an impact modifier (b); a compatibilizer (c); and an electroconductive filler (d), wherein the electroconductive filler (d) may include aromatic compounds having molecular weights of about 120 to about 1,000 g/mol, wherein the aromatic compounds may be byproducts generated when preparing the electroconductive filler (d).

The electroconductive polyamide/polyphenylene resin composition may include about 1 to about 30 parts by weight of impact modifier (b), about 0.2 to about 10 parts by weight of compatibilizer (c), and about 0.1 to about 5 parts by weight of electroconductive filler (d), per about 100 parts by weight of the base resin (a).

The based resin (a) may include about 10 to about 65 wt % of polyphenylene ether (a-1) and about 35 to about 90 wt % of polyamide (a-2).

The electroconductive filler (d) may include carbon black and/or carbon fibril.

The polyphenylene ether (a-1) may include: poly(2,6-dimethyl-1,4-phenylene) ether, poly(2,6-diethyl-1,4-phenylene) ether, poly(2,6-dipropyl-1,4-phenylene) ether, poly(2-methyl-6-ethyl-1,4-phenylene) ether, poly(2-methyl-6-propyl-1,4-phenylene) ether, poly(2-ethyl-6-propyl-1,4-phenylene) ether, poly(2,6-diphenyl-1,4-phenylene) ether, copolymer of poly(2,6-dimethyl-1,4-phenylene) ether and poly(2,3,6-trimethyl-1,4-phenylene) ether, copolymer of poly(2,6-dimethyl-1,4-phenylene) ether and poly(2,3,6-triethyl-1,4-phenylene) ether, or a combination thereof.

The polyamide (a-2) may include: polyamide 6, polyamide 66, polyamide 46, polyamide 11, polyamide 12, polyamide 610, polyamide 612, polyamide 6/66, polyamide 6/612, polyamide MXD6, polyamide 6/MXD6, polyamide 66/MXD6, polyamide 6T, polyamide 6I, polyamide 6/6T, polyamide 6/6I, polyamide 66/6T, polyamide 66/6I, polyamide 6/6T/6I, polyamide 66/6T/6I, polyamide 9T, polyamide 9I, polyamide 6/9T, polyamide 6/9I, polyamide 66/9T, polyamide 6/12/9T, polyamide 66/12/6I, or a combination thereof.

The impact modifier (b) may include (b-1) styrenic elastomer and/or (b-2) olefin elastomer.

The styrenic elastomer (b-1) may include: a block copolymer including an aromatic vinyl compound and conjugated diene compound; a hydrogenated block copolymer prepared by hydrogenating the block copolymer including an aromatic vinyl compound and conjugated diene compound; a modified block copolymer prepared by modifying the block copolymer including an aromatic vinyl compound and conjugated diene compound with an α,β-unsaturated dicarboxylic acid and/or α, β-unsaturated dicarboxylic acid derivative; a modified hydrogenated block copolymer prepared by modifying the hydrogenated block copolymer including an aromatic vinyl compound and conjugated diene compound with an α,β-unsaturated dicarboxylic acid and/or α,β-unsaturated dicarboxylic acid derivative; or a combination thereof.

The styrenic elastomer (b-1) may include: a styrene-ethylene-butylene-styrene copolymer; styrene-butadiene-styrene copolymer; styrene-ethylene-propylene-styrene copolymer; styrene-isoprene-styrene copolymer; styrene-ethylene copolymer; styrene-ethylene-butadiene-styrene copolymer; modified styrene-ethylene-butylene-styrene copolymer; modified styrene-butadiene-styrene copolymer; modified styrene-ethylene-propylene-styrene copolymer; modified styrene-isoprene-styrene copolymer; modified styrene-ethylene copolymer; and/or modified styrene-ethylene-butadiene-styrene copolymer, wherein each modified copolymer is prepared by modifying the styrene-ethylene-butylene-styrene copolymer, styrene-butadiene-styrene copolymer, styrene-ethylene-propylene-styrene copolymer, styrene-isoprene-styrene copolymer, styrene-ethylene copolymer, and styrene-ethylene-butadiene-styrene copolymer, respectively, with an α,β-unsaturated dicarboxylic acid and/or an α,β-unsaturated dicarboxylic acid derivative; or a combination thereof.

The olefin elastomer (b-2) may include: high-density polyethylene; low-density polyethylene; linear low-density polyethylene; ethylene-α-olefin copolymer; modified high-density polyethylene; modified low-density polyethylene; modified linear low-density polyethylene; and/or modified ethylene-α-olefin copolymer, wherein each modified olefin elastomer is prepared by modifying the high-density polyethylene, low-density polyethylene, linear low-density polyethylene, and ethylene-α-olefin copolymer, respectively, with an α,β-unsaturated dicarboxylic acid and/or an α,β-unsaturated dicarboxylic acid derivative; or a combination thereof.

The compatibilizer (c) may include: maleic acid, maleic acid anhydride, maleic acid hydrazide, dichloromaleic acid anhydride, unsaturated dicarboxylic acid, fumaric acid, citric acid, citric acid anhydride, malic acid, agaric acid, or a combination thereof.

According to another embodiment of the present invention, there is provided a molded product for vehicles, the product manufactured from the aforementioned electroconductive polyamide/polyphenylene ether resin composition.

According to the aforementioned embodiments of the present invention, by including, in the electroconductive filler to be used, aromatic compounds of certain molecular weights, that are byproducts from the process of preparing the conductive filler, it is possible to obtain an electroconductive polyamide/polyphenylene ether resin composition having excellent electric characteristics even by adding a small amount of electroconductive filler.

Furthermore, as only a small amount of electroconductive filler is added, deterioration of mechanical properties may be restricted, thus providing a resin composition with better impact resistance and mechanical strength compared to conventional resin compositions.

Therefore, it is possible to obtain an electroconductive polyamide/polyphenylene ether resin composition where impact resistance, mechanical strength, electroconductivity, and economic feasibility are well-balanced.

The aforementioned effects of the various embodiments of the present invention are not limited to the aforementioned effects, but other effects not mentioned herein may also be clearly understood by those skilled in the art based on the claims.

DETAILED DESCRIPTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Furthermore, a singular form may include a plural form as long as it is not specifically mentioned in a sentence. Furthermore, "include/comprise" or "including/comprising" used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

Hereinafter, an electroconductive polyamide/polyphenylene ether resin composition according to an embodiment of the present invention will be explained in detail.

The electroconductive polyamide/polyphenylene ether resin composition according to an embodiment of the present invention may be a thermoplastic resin composition including a compatibilized blend of polyphenylene ether and polyamide.

The electroconductive polyamide/polyphenylene ether resin composition may include a base resin (a) including polyphenylene ether (a-1) and polyamide (a-2); an impact modifier (b); a compatibilizer (c); and a conductive filler including aromatic compounds having molecular weights of about 120 to about 1,000 g/mol.

In the embodiments of the present invention, a compatibilized blend refers to a composition that is physically and/or chemically compatibilized with a compatibilizer.

Compatibility refers to the extent to which a substance may be compatibilized. The higher the compatibility, the easier it is to be compatibilized, whereas the lower the compatibility, the more difficult it is to be compatibilized.

Hereinafter, each of the components constituting an electroconductive polyamide/polyphenylene ether resin composition according to an embodiment of the present invention will be explained in detail.

(a) Base Resin (a-1) Polyphenylene Ether

Examples of the polyphenylene ether (a-1) may include without limitation polyphenylene ether polymers, mixtures of a polyphenylene ether polymer and a vinyl aromatic polymer, modified polyphenylene ether polymers formed by reacting the polyphenylene ether polymer with a reactive monomer, and the like, and combinations thereof.

Examples of the polyphenylene ether polymer may be include without limitation: poly(2,6-dimethyl-1,4-phenylene) ether, poly(2,6-diethyl-1,4-phenylene) ether, poly(2,6-dipropyl-1,4-phenylene) ether, poly(2-methyl-6-ethyl-1,4-phenylene) ether, poly(2-methyl-6-propyl-1,4-phenylene) ether, poly(2-ethyl-6-propyl-1,4-phenylene) ether, poly(2,6-diphenyl-1,4-phenylene) ether, copolymer of poly(2,6-dimethyl-1,4-phenylene) ether and poly(2,3,6-trimethyl-1,4-phenylene) ether, copolymer of poly(2,6-dimethyl-1,4-phenylene) ether and poly(2,3,6-trimethyl-1,4-phenylene) ether, and the like, and combinations thereof.

In exemplary embodiments, a copolymer of poly(2,6-dimethyl-1,4-phenylene) ether and poly(2,3,6-trimethyl-1,4-phenylene) ether and/or a copolymer of poly(2,6-dimethyl-1,4-phenylene) ether and poly(2,3,6-trimethyl-1,4-phenylene) ether may be used, for example, poly(2,6-dimethyl-1,4-phenylene) ether may be used.

The vinyl aromatic polymer may include a polymer and/or copolymer of one or more aromatic vinyl monomers. Examples of the aromatic vinyl monomers can include without limitation styrene, p-methylstyrene, α-methylstyrene, 4-n-propylstyrene, and the like, and combinations of two or more vinyl aromatic monomers. In exemplary embodiments, the vinyl aromatic monomer may include styrene and/or α-methylstyrene.

Examples of the reactive monomer may include without limitation unsaturated carboxylic acids and/or anhydrides thereof, and/or modified unsaturated carboxylic acids and/or anhydrides thereof. Such a reactive monomer may play the role of reacting with the polyphenylene ether polymer according to an embodiment of the present invention to form a modified polyphenylene ether polymer.

Examples of the reactive monomer may include without limitation citric acid, citric acid anhydride, maleic acid anhydride, maleic acid, itaconic acid anhydride, fumaric acid, (meth)acrylic acid, (meth)acrylic acid ester, and the like, and combinations thereof.

There is no particular limitation to the method for preparing a modified polyphenylene ether polymer by reacting a polyphenylene ether polymer with a reactive monomer. In exemplary embodiments, it can be effective to graft-react a polyphenylene ether polymer with a reactive monomer, with the polyphenylene ether polymer melt and mulled using a phosphite heat stabilizer, considering the relatively high operating temperature.

There is no particular limitation to the degree of polymerization of polyphenylene ether according to an embodiment of the present invention. In exemplary embodiments, the polyphenylene ether can have an intrinsic viscosity of about 0.2 to about 0.8 dl/g when measured using a chloroform solvent of 25° C., for example, about 0.3 to about 0.6 dl/g.

The thermal resistance and mechanical strength can be excellent and thus enable easy processing when the intrinsic viscosity is within the aforementioned range.

The base resin can include polyphenylene ether in an amount of about 10 to about 65 wt %, for example, about 20 to about 50 wt %, per 100 wt % of a base resin including polyphenylene ether and polyamide. In some embodiments, the base resin may include the polyphenylene ether in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, or 65 wt %. Further, according to some embodiments of the present invention, the amount of the polyphenylene ether can be in a range from about any of the foregoing amounts to about any other of the foregoing amounts.

If the polyphenylene ether is present in an amount outside the aforementioned range, a problem may occur such as deterioration of flexibility or chemical resistance, or difficulty in processing.

(a-2) Polyamide

Amino acid, lactam, or diamine and dicarboxylic acid may be the main monomer substance of polyamide (a-2).

Representative examples of the main monomer substance include without limitation: amino acids such as 6-aminocapronic acid, 11-aminoundecanic acid, 12-aminododecanic acid, and para aminomethylbenzoid acid; lactams such as ϵ-caprolactam and ω-laurolactam; aliphatic, alicyclic, and/or aromatic diamines such as tetramethylenediamine, hexamethylenediamine, 2-methylpentamethylenediamine, nonamethylenediamine, undecamethylenediamine, dodecamethylenediamine, 2,2,4-/2,4,4-trimethylhexamethylenediamine, 5-methylnonamethylenediamine, metaxylenediamine, paraxylenediamine, 1,3-bis(aminomethyl)cyclohexane, 1,4-bis (aminomethyl)cyclohexane, 1-amino-3-aminomethyl-3,5,5-trimethylcyclohexane, bis(4-aminocyclohexyl)methane, bis (3-methyl-4-aminocyclohexyl)methane, 2,2-bis(4-aminocyclohexyl)propane, bis(aminopropyl) piperazine, aminoethylpiperazine; and aliphatic, alicyclic, and/or aromatic dicarboxylic acids such as adipic acid, suberic acid, azelaic acid, sebacic acid, dodecanoic acid, terephthalic acid, isophthalic acid, 2-chloroterephthalic acid, 2-methylterephthalic acid, 5-methylisophthalic acid, 5-sodium sulfoisophthalic acid, 2,6-naphthalenedicarboxylic acid, hexahydroterephthalic acid, and hexahydroisophthalic acid; and the like. A polyamide homopolymer and/or copolymer derived from the aforementioned materials may be used solely or in a mixture.

Specific examples of polyamide according to an embodiment of the present invention include without limitation polyamide 6, polyamide 66, polyamide 46, polyamide 11, polyamide 12, polyamide 610, polyamide 612, polyamide 6/66, polyamide 6/612, polyamide MXD6, polyamide 6/MXD6, polyamide 66/MXD6, polyamide 6T, polyamide 6I, polyamide 6/6T, polyamide 6/6I, polyamide 66/6T, polyamide 66/6I, polyamide 6/6T/6I, polyamide 66/6T/6I, polyamide 9T, polyamide 9I, polyamide 6/9T, polyamide 6/9I, polyamide 66/9T, polyamide 6/12/9T, polyamide 66/12/9T, polyamide 66/12/9I, polyamide 66/12/6I and the like, and combinations thereof mixed in an appropriate rate.

The melting point of the polyamide may be about 220 to about 360° C., for example about 230 to about 320° C., and as another example about 240 to about 300° C.

To provide a resin composition with excellent mechanical properties and thermal resistance, the relative viscosity of the polyamide may be or above about 2, for example about 2 to about 4. Herein, the relative viscosity may be measured at 25° C. after adding 1 wt % of polyamide to m-cresol.

The base resin may include the polyamide in an amount of about 30 to about 90 wt %, for example about 40 to about 80 wt %, per 100 wt % of the base resin including polyphenylene ether and polyamide. In some embodiments, the base resin may include the polyamide resin in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74 75, 76, 77, 78, 79, 80, 81, 82, 83, 84, 85, 86, 87, 88, 89, or 90 wt %. Further, according to some embodiments of the present invention, the amount of the polyamide resin can be in a range from about any of the foregoing amounts to about any other of the foregoing amounts.

If the amount of polyamide is outside the aforementioned range, a problem may occur such as deterioration of compatibility, mechanical properties, and thermal resistance.

(b) Impact Modifier

An impact modifier may play the role of improving the impact resistance of a polyamide/polyphenylene ether resin composition.

The impact modifier used herein may be styrenic elastomer (b-1), olefin elastomer (b-2), or a combination thereof.

The polyamide/polyphenylene ether resin composition may include the impact modifier in an amount of about 1 to about 30 parts by weight, for example about 5 to about 20 parts by weight, and as another example about 6 to about 15 parts by weight per about 100 parts by weight of the base resin. In some embodiments, the polyamide/polyphenylene ether resin composition may include the impact modifier in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 parts by weight. Further, according to some embodiments of the present invention, the amount of the impact modifier can be in a range from about any of the foregoing amounts to about any other of the foregoing amounts.

(b-1) Styrenic Elastomer

Examples of the styrenic elastomer (b-1) may include without limitation block copolymers including an aromatic vinyl compound and conjugated diene compound; hydrogenated block copolymers prepared by hydrogenating the block copolymer including an aromatic vinyl compound and conjugated diene compound; modified block copolymers prepared by modifying the block copolymer including an aromatic vinyl compound and conjugated diene compound with an α,β-unsaturated dicarboxylic acid and/or an α,β-unsaturated dicarboxylic acid derivative; modified hydrogenated block copolymers prepared by modifying the hydrogenated block copolymer including an aromatic vinyl compound and conjugated diene compound with an α,β-unsaturated dicarboxylic acid and/or an α,β-unsaturated dicarboxylic acid derivative; and the like, and combinations thereof.

Examples of the aromatic vinyl compound may include without limitation styrene, p-methylstyrene, p-methylstyrene, α-methylstyrene, bromostyrene, chlorostyrene, and the like, and combinations thereof. In exemplary embodiments, the aromatic vinyl compound may include styrene.

The styrenic elastomer is derived from an aromatic vinyl compound, the styrenic elastomer having a linear structure including a diblock (A-B block), triblock (A-B-A block), tetrablock (A-B-A-B block), pentablock (A-B-A-B-A block), and/or a linear structure including six or more blocks of A and B.

Specific examples of styrenic elastomer that may be used include without limitation a styrene-ethylene-butylene-styrene copolymer, styrene-butadiene-styrene copolymer, styrene-ethylene-propylene-styrene copolymer, styrene-isoprene-styrene copolymer, styrene-ethylene copolymer, styrene-ethylene-butadiene-styrene copolymer, modified styrene-ethylene-butylene-styrene copolymer, modified styrene-butadiene-styrene copolymer, modified styrene-ethylene-propylene-styrene copolymer; modified styrene-isoprene-styrene copolymer, modified styrene-ethylene copolymer, and/or modified styrene-ethylene-butadiene-styrene copolymer, wherein each modified styrene elastomer is prepared by modifying one of the aforementioned non-modified styrenic elastomers with an α,β-unsaturated dicarboxylic acid and/or an α,β-unsaturated dicarboxylic acid derivative. In some cases, two or more of the aforementioned may be used. In exemplary embodiments, the styrenic elastomer can include styrene-ethylene-butylene-styrene copolymer.

(b-2) Olefin Elastomer

Examples of the olefin elastomer (b-2) may include without limitation: a high-density polyethylene, low-density polyethylene, linear low-density polyethylene, ethylene-α-olefin copolymer, and the like, and combinations thereof; and/or modified high-density polyethylene, modified low-density polyethylene, modified linear low-density polyethylene, and/or modified ethylene-α-olefin copolymer, wherein each modified olefin elastomer is prepared by modifying one of the aforementioned non-modified olefin elastomers with an α,β-unsaturated dicarboxylic acid and/or an α,β-unsaturated dicarboxylic acid derivative, respectively.

The olefin elastomer may be a (co)polymer polymerized using an olefin monomer(s) and/or a copolymer of the olefin monomer and an acrylic monomer.

The olefin monomer used may include a C1-C19 alkylene, for example, ethylene, propylene, isopropylene, butylene, isobutylene, octene, or a combination thereof.

The acrylic monomer used may be a (meth)acrylic acid alkyl ester and/or (meth)acrylic acid ester. As used herein, the alkyl may be a C1-C10 alkyl. Examples of the (meth)acrylic acid alkyl ester that may be used include without limitation methyl(meth)acrylate, ethyl(meth)acrylate, propyl(meth) acrylate, butyl(meth)acrylate, and the like, and combinations thereof, for example, methyl(meth)acrylate.

The olefin elastomer may include a reactive group that may react with polyamide and the olefin elastomer may have a structure where a reactive group is grafted to a main chain including an olefin monomer or a copolymer of the olefin monomer and an acrylic monomer.

Examples of the reactive group may include without limitation a maleic acid anhydride group and/or an epoxy group.

In an embodiment, the olefin elastomer including a reactive group may include without limitation a modified ethylene-α-olefin copolymer and/or modified low-density polyethylene grafted with a maleic acid anhydride. Such an olefin elastomer can improve the compatibility of polyphenylene ether and polyamide.

(c) Compatibilizer

Compatibilizer (c) may be a compound including two types of functional groups, or a compound modified to a compound including two types of functional groups when reacted. Examples of one of the two types of functional groups may include without limitation a double carbon bond and/or triple carbon bond. Examples of the other of the two types of functional groups may include without limitation a carboxylic group, acid anhydride group, epoxy group, imide group, amide group, ester group, and/or a functional group of acidic chloride and/or effective equivalent thereof.

Specific examples of the compatibilizer that may be used include without limitation maleic acid, maleic acid anhydride, fumaric acid, maleic hydrazide, dichloro maleic acid anhydride, unsaturated dicarboxylic acid, citric acid, citric acid anhydride, malic acid, agaric acid, and the like. In some cases, two or more of the aforementioned may be mixed and used.

In exemplary embodiments, examples of the compatibilizer include without limitation maleic acid, maleic acid anhydride, fumaric acid, citric acid, and/or citric acid anhydride, for example maleic anhydride and/or citric anhydride.

When the compatibilizer and/or a modified compatibilizer reacts with polyphenylene ether and polyamide, a block copolymer of polyphenylene ether and polyamide may be generated.

In the polyamide/polyphenylene ether resin composition, the block copolymer can be distributed along an interface of the two substances, thus stabilizing the morphology of the resin composition. Especially, in a case where the polyamide/polyphenylene ether resin composition has a morphology where the polyphenylene ether has a domain phase (dispersed phase) and the polyamide has a matrix phase (continuous phase), the block copolymer seems to play an important role in controlling the particle diameter of the domain phase to an effective about 1 μm (Polymer Engineering and Science, 1990, vol. 30, No. 17, p. 1056-1062).

The polyamide/polyphenylene ether resin composition may include the compatibilizer in an amount of about 0.2 to about 10 parts by weight per about 100 parts by weight of the base resin. In some embodiments, the polyamide/polyphenylene ether resin composition may include the compatibilizer in an amount of about 0.2, 0.3, 0.4, 0.5, 0.6, 0.7, 0.8, 0.9, 1, 2, 3, 4, 5, 6, 7, 8, 9, or 10 parts by weight. Further, according to some embodiments of the present invention, the amount of the compatibilizer can be in a range from about any of the foregoing amounts to about any other of the foregoing amounts.

When the compatibilizer is present in an amount less than about 0.2 parts by weight per about 100 parts by weight of the base resin, there may be little effect of improving the impact strength. When the compatibilizer is present in an amount of more than 10 parts by weight per about 100 parts by weight of the base resin, the impact strength may not increase any more, and other properties can deteriorate as well.

(d) Electroconductive Filler

Electroconductive filler (d) may be dispersed in the polyamide/polyphenylene ether composition, providing electroconductivity.

Examples of the electroconductive filler may include without limitation carbon black and/or carbon fibril.

There is no limitation to the type of the carbon black, but an electroconductive carbon black may be used. Specific examples that may be used include graphitized carbon black, furnace black, acetylene black, and/or ketjen black.

Carbon fibril is a carbon material in the form of fiber where carbon accounts for 90 wt % or more of the total mass.

An example of the carbon fibril that may be used herein are carbon nanotubes. Carbon nanotubes have a large aspect ratio and a large specific surface area, and also excellent mechanical properties, electric properties, and thermal properties, and thus they are effective materials to be used for an engineering plastic material.

Carbon nanotubes may be classified into single wall, double wall, and multiple wall carbon nanotubes depending on the number of walls that carbon nanotubes are composed of. Furthermore, they may be classified into zigzag, armchair, and chiral structured carbon nanotubes depending on the angle by which a graphene surface is curled. There is no limitation to the type or structure of the carbon nanotubes used herein. In exemplary embodiments, multiple wall nanotubes may be used.

There is no particular limitation to the size of the carbon nanotubes that may be used herein. In exemplary embodiments, the diameter may be about 0.5 to about 100 nm, for example about 1 to about 10 nm, and the length may be about 0.01 to about 100 μm, for example about 0.5 to about 10 μm. Carbon nanotubes can provide excellent electroconductivity and processibility when the diameter and length are within the aforementioned range.

Furthermore, due to the aforementioned size, the carbon nanotubes have large aspect ratios (L/D). The carbon nanotubes can have an aspect ratio of about 100 to about 1,000 L/D, which can provide excellent electroconductivity.

Inventors of the embodiments of the present invention discovered a remarkable fact that will be set forth hereinafter and came to complete the embodiments of the present invention.

Byproducts generated when preparing an electroconductive filler may play the role of further improving the electroconductivity. Such byproducts may be aromatic compounds, and the molecular weights of the aromatic compounds may be about 120 to about 1,000 g/mol. When the molecular weights of the aromatic compounds are within this range, electroconductivity may be improved.

The electroconductive filler may include the aromatic compounds in an amount of about 0.1 to about 5 wt % per 100 wt % of electroconductive filler. In some embodiments, the electroconductive filler may include the aromatic compounds in an amount of about 0.1, 0.2, 0.3, 0.4, 0.5, 0.6, 0.7, 0.8, 0.9, 1, 2, 3, 4, or 5 wt %. Further, according to some embodiments of the present invention, the amount of the aromatic compounds can be in a range from about any of the foregoing amounts to about any other of the foregoing amounts.

When the electroconductive filler includes a byproduct in an amount within this range, the resin composition may have excellent electroconductivity.

The content (amount) of the byproduct may be controlled by adjusting the post-processing conditions of the electroconductive filler, more particularly, by controlling the temperature and duration of heating the electroconductive filler. By heating the electroconductive filler at about 950 to about 1,050° C., while also controlling the heating time, the content of the byproduct to be included in the electroconductive filler may be controlled to be about 0.1 to about 5 wt %.

The electroconductive filler may be prepared by a conventional method.

Of such electroconductive fillers, carbon fibril can be prepared by bringing a metal catalyst and a gas containing carbon into contact with each other inside a reactor under a reacting condition that includes certain temperatures, for example about 400 to about 850° C., and as another example about 600 to about 750° C.

Carbon fibril may be prepared by continuously bringing metal catalyst particles into contact with the gas containing carbon in the reactor under the temperatures within the aforementioned range.

Examples of such gas include without limitation aliphatic hydrocarbons such as ethylene, propylene, propane and methane; carbon monoxide; aromatic hydrocarbons such as benzene, naphthalene, and toluene; acidized hydrocarbons, and the like, and mixtures thereof.

The catalysts can include catalysts prepared using a non-aqueous solvent. A catalyst may contain iron, and at least one element selected from V group (for example, vanadium), VI group (for example, molybdenum, tungsten or chrome), VII group (for example, manganese) and lanthanons (for example, cerium). Non-aqueous catalysts can be effective, since they have good recyclability, and their pH need not be adjusted carefully, and their thermal history is not required.

A catalyst in the form of metal particles may be attached to a support, for example, an alumina support.

When such a carbon fibril is generated in the aforementioned method, aromatic compounds are also generated as byproducts. Such aromatic compounds are not substances that are added as components of the resin composition, but they are substances generated as byproducts in the process of preparing the electroconductive filler.

The content (amount) of the aromatic compounds may be measured by extracting the aromatic compounds using an organic solvent from the electroconductive filler.

Besides the aforementioned, the electroconductive polyamide/polyphenylene ether resin composition may further include one or more additives such as but not limited to a flame retardant, a lubricant, a plasticizer, a heat stabilizer, an antioxidant, a light stabilizer, a colorant, an inorganic filler, and the like, and mixtures thereof. Depending on the characteristics of a final molded product, two or more of the aforementioned additives may be mixed and used.

A flame retardant is a substance that reduces combustibility. Examples of the flame retardant may include without limitation phosphate compounds, phosphite compounds, phosphonate compounds, polysiloxanes, phosphazene compounds, phosphinate compounds, melamine compounds, and the like, and combinations thereof.

A lubricant is a substance for lubricating the interface of the resin composition between the metal surface that contacts the electroconductive polyamide/polyphenylene ether resin composition during processing, molding, and extruding, thereby helping the flow or movement of the resin composition. Herein, a generally used lubricant may be used.

A plasticizer is a material for improving the flexibility, processibility, and expansibility of the electroconductive polyamide/polyphenylene ether resin composition. Herein, a generally used plasticizer may be used.

A heat stabilizer is a material for restraining thermal decomposition of the polyamide/polyphenylene ether resin composition when being mulled and molded at high temperatures. A generally used material may be used as heat stabilizer.

An antioxidant is a material for restraining or preventing chemical reaction of the electroconductive polyamide/polyphenylene ether resin composition with oxygen, thus preventing the resin composition from being decomposed and losing its intrinsic properties. Examples of the antioxidant may include without limitation phenolic type antioxidants, phosphate type antioxidants, thioether type antioxidants, amine type antioxidants, and the like, and combinations thereof.

A light stabilizer is a material for restraining or preventing the electroconductive polyamide/polyphenylene ether resin composition from being decomposed by ultraviolet rays or losing its mechanical properties. In exemplary embodiments, titanium oxide may be used as light stabilizer.

A colorant used herein may include a pigment and/or dye.

The additives may be present in an amount of about 0.1 to about 10 parts by weight per about 100 parts by weight of the base resin. If the additives are present in an amount outside of this range, either the mechanical properties of the electroconductive polyamide/polyphenylene ether resin composition can deteriorate or the exterior appearance of a product molded using the resin composition may become defective.

An electroconductive polyamide/polyphenylene ether resin composition having components in amounts according to an embodiment of the present invention can have excellent impact resistance and mechanical strength, and also can have improved electroconductivity, thereby providing excellent electrical characteristics.

An electroconductive polyamide/polyphenylene ether resin composition according to an embodiment of the present invention may be prepared by a well known method. When the aforementioned components are used in certain amounts, even when an electroconductive filler is added before compatibilization of polyphenylene ether and polyamide, the electroconductive filler will have no effect on forming a compatibilized blend, and thus it is possible to embody an electroconductive polyamide/polyphenylene ether resin composition having excellent properties, and after mixing the aforementioned component substances with additives, the reactant may be melted and extruded in the extruder, thus preparing the resin composition in the form of pellets.

For example, by melting and mulling (mixing) polyphenylene ether, compatibilizer, impact modifier, and electroconductive filler to prepare an electroconductive polyphenylene ether resin composition, and then by further melting and mulling the polyphenylene ether resin composition after adding polyamide thereto, it is possible to prepare an electroconductive polyamide/polyphenylene ether resin composition where the polyphenylene ether and the polyamide are well compatibilized.

Furthermore, even by using a smaller amount of electroconductive filler than in a conventional method, excellent electroconductivity can be embodied due to the existence of byproducts contained in the electroconductive filler, and a molded product manufactured from the same can also have an excellent exterior appearance.

A molded product for vehicle according to an embodiment of the present invention may be manufactured using the aforementioned electroconductive polyamide/polyphenylene ether resin composition. The aforementioned electroconductive polyamide/polyphenylene ether resin composition having excellent electroconductivity, impact resistance, and mechanical strength may be used, without limitation, in automobile components such as a tail gate, fuel door, fender, door panel and the like.

EXAMPLES

Hereinafter, a result of a test conducted to prove the excellent effects of the electroconductive polyamide/polyphenylene ether resin composition of the present invention will be shown.

Components used in the electroconductive polyamide/polyphenylene ether resin composition according to the embodiments and comparative embodiments of the present invention are shown below.

(a) Base Resin (a-1) Polyphenylene Ether,

Xyron S201A, a poly(2,5-dimethyl-1,4-phenylene) ether product of Asahi Kasei Chemical Corp., is used.

(a-2) Polyamide

STABAMID 24 AE 1K, a polyamide 66 product of Rhodia Co., is used.

(b) Impact Modifier (b-1) Styrene Elastomer

KRATON G 1651, a styrene-ethylene-butylene-styrene copolymer of KRATON polymers Co., is used.

(b-2) Olefin Elastomer

A maleic anhydride modified ethylene-propylene copolymer is used.

(c) Compatibilizer

Citric acid anhydride of Sigma-Aldrich Co. is used.

(d) Electroconductive Filler (d-1) A carbon fibril including 0.5 wt % of aromatic compounds having molecular weights of 120 to 1,000 g/mol is used. The carbon fibril is heated for about 5 minutes at about 980° C. ambient temperature.

(d-2) A carbon fibril including 0.05 wt % of aromatic compounds having molecular weights of 120 to 1,000 g/mol is used. The carbon fibril is heated for about 5 minutes at about 1,200° C. ambient temperature.

(d-3) A carbon fibril including 6 wt % of aromatic compounds having molecular weights of 120 to 1,000 g/mol is used. The carbon fibril is not heated.

The content (amount) of the aromatic compounds in the carbon fibril is measured after extracting the carbon fibril from tetrahydrofuran that is an extracting solvent, and a soxhlet extractor is used.

The electroconductive filler is put into the tetrahydrofuran solvent, and a first extraction is performed for about 8 hours, and then the aromatic compounds dissolved in the tetrahydrofuran by the first extraction is recovered. Then, using pure tetrahydrofuran, a second extraction is performed on the remaining electroconductive filler. In the same way, extraction is performed continuously until there are no aromatic compounds to be extracted.

Crude aromatic compounds are obtained by gathering the aromatic compounds collected in the tetrahydrofuran at each extraction and then evaporating the tetrahydrofuran solvent, and then the mass of the crude aromatic compounds are measured. The molecular weight of the aromatic compounds are determined by a liquid chromatography (LC-MS) having a mass spectrometer.

The aromatic compounds having molecular weights greater than 1,000 g/mol are not observed in the mass spectrometer, and the aromatic compounds having molecular weights smaller than 120 g/mol are determined according to the peak strength of the mass spectrometer, and the content of the aromatic compounds are obtained by subtracting the content of the crude aromatic compounds from the content of the aromatic compounds. The content of the aromatic compounds contained in the carbon fibril are calculated using the ratio of content of the aromatic compounds and the content of the carbon fibril before the first extraction is performed.

An electroconductive polyamide/polyphenylene ether resin composition according to embodiments and comparative examples of the present invention is prepared using the substance ratios listed in table 1.

The substances listed in ‘main feed’ in table 1 are dry-mixed, and then continuously input quantitatively into a main feeding port of a twin-screw extruder TEX-40 (manufacturer: JSW Co.). The substances listed in ‘side feed’ in table 1 are continuously input quantitatively into a side feeding port of the twin-screw extruder, and then melted/mulled. Herein, the screw rotation speed of the extruder is 400 rpm, and the total production speed is about 100 kg per hour. Then, a resin composition pelletized by the extruder is obtained.

Herein, the side feeding port refers to the port located close to the die of the extruder.

The base resins a-1 and a-2 combined are 100 parts by weight, based on which the parts by weight are shown.

TABLE 1

| | | Embodiment | Comparative examples | |
|---|---|---|---|---|
| | Substances | 1 | 1 | 2 |
| Main feed | (a-1) | 40 | 40 | 40 |
| | (b-1) | 6 | 6 | 6 |
| | (b-2) | 5 | 5 | 5 |
| | (c) | 0.7 | 0.7 | 0.7 |
| | (d-1) | 1 | — | — |
| | (d-2) | — | 1 | — |
| | (d-3) | — | — | 1 |
| Side feed | (a-2) | 60 | 60 | 60 |

Izod impact strength, tensile strength and surface resistance of electroconductive polyamide/polyphenylene ether resin compositions of embodiment 1 and comparative examples of 1 to 2 are evaluated using the methods described below. The results are set forth in table 2.

<Izod Impact Strength>

After injection-molding polyamide/polyphenylene ether resin composition pellets of embodiment 1, and comparative examples 1 to 2 into type A multipurpose specimens according to ISO 3167, both end taps of each specimen are cut to a size of 80 mm×10 mm×4 mm, and a notch with a depth of 8 mm is made in the specimen, and then Izod impact strength is measured according to ISO 180/1A. The average value of the measurement results of ten specimens is used as the estimation result.

<Tensile Strength>

After injection-molding polyamide/polyphenylene ether resin composition pellets of embodiment 1 and comparative examples 1 to 2 into type A multipurpose specimens according to ISO 3167, the tensile strengths are measured according to ISO 527. The average value of the measurement results of 5 specimens is used as the estimation result.

<Surface Resistance>

Specimens for surface resistance measurement are prepared by thermal compression molding. After putting about 6 g of pellets of the electroconductive polyamide/polyphenylene ether resin compositions of embodiment 1 and comparative examples 1 to 2 into a mold having a cavity of 100 mm×100 mm×0.5 mm, the mold is placed between a pair of metal plates, and then the mold is inserted into a thermal compression molding machine set to about 300° C. After applying about 50 kg/cm$^2$ of pressure to the mold and the metal plate for 3 minutes, the mold and the metal plate are taken out of the thermal compression molding machine and then inserted into a cooling compression molding machine set to about 25° C. After applying about 50 kg/cm$^2$ of pressure to the mold and the metal plate for 2 minutes, the mold and metal plate are taken out from the cooling compression molding machine, and then a specimen of about 100 mm×100 mm×0.5 mm is separated from the mold and the pair of metal plates in order to measure the surface resistance. The compression molded specimens are conditioned at a temperature of about 23° C. and a relative humidity of about 50% for about 6 hours.

Surface resistances of the polyamide/polyphenylene ether resin compositions of embodiment 1 and comparative examples 1 to 2 are measured at a temperature of about 23° C. and a relative humidity of about 50% using Hiresta-UP MCP-HT450, which is a resistance measurement system having a probe MCP-HTP14 made by Mitsubishi Chemical Analytech Co. During the measurement process, 250V voltage is maintained for 30 seconds.

The surface resistance is measured 5 times for each specimen, and from these measurements, an average is obtained.

TABLE 2

| | Embodiment 1 | Comparative example 1 | Comparative example 2 |
|---|---|---|---|
| Izod impact strength (kJ/m$^2$) | 25 | 23 | 19 |
| Tensile strength (MPa) | 57 | 55 | 35 |
| Surface resistance (Ω/□) | $7 \times 10^5$ | $2 \times 10^8$ | $2 \times 10^6$ |

From tables 1 and 2, it can be seen that the electroconductive polyamide/polyphenylene ether resin compositions of embodiment 1 exemplifying the invention maintain excellent levels of impact strength, mechanical strength, and electroconductivity.

Embodiment 1 and comparative examples 1 to 2 all include aromatic compounds that are byproducts of the electroconductive filler, but there are great differences between embodiment 1 and the comparative examples in terms of impact strength, tensile strength and surface resistance.

Compared to comparative example 2, embodiment 1 exhibits excellent electroconductivity even though it includes a small content (amount) of carbon fibril.

When the content (amount) of the aromatic compounds that are byproducts of the electroconductive filler is outside the range disclosed herein, the Izod impact strength and tensile strength decrease, deteriorating the impact resistance and mechanical strength, and the surface resistance is extremely high, deteriorating the electroconductivity.

Accordingly, the tests show that an electroconductive polyamide/polyphenylene ether resin composition having excellent characteristics can be embodied when the electroconductive filler included aromatic compounds in an amount within the range disclosed herein as byproducts, types of impurities.

Furthermore, the content (amount) of the aromatic compounds can be adjusted not by adding additional substances but by controlling the heating conditions in the process of preparing the electroconductive filler.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

What is claimed is:

1. An electroconductive polyamide/polyphenylene ether resin composition comprising:

a base resin (a) including polyphenylene ether (a-1) and polyamide (a-2);

an impact modifier (b);

a compatibilizer (c); and an electroconductive filler (d), wherein the electroconductive filler (d) comprises aromatic compounds having molecular weights of about 120 to about 1,000 g/mol in an amount of about 0.1 to about 5 wt % per 100 wt % of electroconductive filler, and the aromatic compounds are byproducts generated when preparing the electroconductive filler (d).

2. The composition according to claim 1, comprising:

about 1 to about 30 parts by weight of impact modifier (b), about 0.2 to about 10 parts by weight of compatibilizer (c), and about 0.1 to about 5 parts by weight of electroconductive filler (d), per about 100 parts by weight of the base resin (a).

3. The composition according to claim 1, wherein the base resin (a) comprises about 10 to about 65 wt % of polyphenylene ether (a-1) and about 35 to about 90 wt % of polyamide (a-2).

4. The composition according to claim 1, wherein the electroconductive filler (d) comprises carbon black and/or carbon fibril.

5. The composition according to claim 1, wherein the polyphenylene ether (a-1) comprises: poly(2,6-dimethyl-1,4-phenylene) ether, poly(2,6-diethyl-1,4-phenylene) ether, poly(2,6-dipropyl-1,4-phenylene) ether, poly(2methyl-6-ethyl-1,4-phenylene) ether, poly(2-methyl-6-propyl-1,4-phenylene) ether, poly(2-ethyl-6-propyl-1,4-phenylene) ether, poly(2,6-diphenyl-1,4-phenylene) ether, copolymer of poly(2,6-dimethyl-1,4-phenylene) ether and poly(2,3,6-trimethyl-1,4-phenylene) ether, copolymer of poly(2,6-dimethyl-1,4-phenylene) ether and poly(2,3,6-triethyl-1,4-phenylene) ether, or a combination thereof.

6. The composition according to claim 1, wherein the polyamide (a-2) comprises: polyamide 6, polyamide 66, polyamide 46, polyamide 11, polyamide 12, polyamide 610, polyamide 612, polyamide 6/66, polyamide 6/612, polyamide MXD6, polyamide 6/MXD6, polyamide 66/MXD6, polyamide 6T, polyamide 6I, polyamide 6/6T, polyamide 6/6I, polyamide 66/6T, polyamide 66/6I, polyamide 6/6T/6I, polyamide 66/6T/6I, polyamide 9T, polyamide 9I, polyamide 6/9T, polyamide 6/9I, polyamide 66/9T, polyamide 6/12/9T, polyamide 66/12/6I, or a combination thereof.

7. The composition according to claim 1, wherein the impact modifier (b) comprises (b-1) styrenic elastomer and/or (b-2) olefin elastomer.

8. The composition according to claim 7, wherein the styrenic elastomer (b-1) comprises: a block copolymer including an aromatic vinyl compound and conjugated diene compound; a hydrogenated block copolymer prepared by hydrogenating the block copolymer including an aromatic vinyl compound and conjugated diene compound; a modified block copolymer prepared by modifying the block copolymer including an aromatic vinyl compound and conjugated diene compound with an α,β-unsaturated dicarboxylic acid and/or an α,β-unsaturated dicarboxylic acid derivative; a modified hydrogenated block copolymer prepared by modifying the hydrogenated block copolymer including an aromatic vinyl compound and conjugated diene compound with an α,β-unsaturated dicarboxylic acid and/or an α,β-unsaturated dicarboxylic acid derivative; or a combination thereof.

9. The composition according to claim 7, wherein the styrenic elastomer (b-1) comprises: a styrene-ethylene-butylene-styrene copolymer; styrene-butadiene-styrene copolymer; styrene-ethylene-propylene-styrene copolymer; styrene-isoprene-styrene copolymer; styrene-ethylene copolymer; styrene-ethylene-butadiene-styrene copolymer; modified styrene-ethylene-butylene-styrene copolymer; modified styrene-butadiene-styrene copolymer; modified styrene-ethylene-propylene-styrene copolymer; modified styrene-isoprene-styrene copolymer; modified styrene-ethylene copolymer; and/or modified styrene-ethylene-butadiene-styrene copolymer, wherein the modified copolymers are each prepared by modifying the styrene-ethylene-butylene-styrene copolymer, styrene-butadiene-styrene copolymer, styrene-ethylene-propylene-styrene copolymer, styrene-isoprene-styrene copolymer, styrene-ethylene copolymer, and styrene-ethylene-butadiene-styrene copolymer, respectively, with an α,β-unsaturated dicarboxylic acid and/or an α,β-unsaturated dicarboxylic acid derivative.

10. The composition according to claim 7, wherein the olefin elastomer (b-2) comprises: high-density polyethylene; low-density polyethylene; linear low-density polyethylene; ethylene-α-olefin copolymer; or modified high-density polyethylene, modified low-density polyethylene, modified linear low-density polyethylene, and/or modified ethylene-α-olefin copolymer, wherein each modified olefin elastomer is prepared by modifying the high-density polyethylene, low-density polyethylene, linear low-density polyethylene, and ethylene-α-olefin copolymer, respectively, with an α,β-unsaturated dicarboxylic acid and/or an α,β-unsaturated dicarboxylic acid derivative.

11. The composition according to claim 1, wherein the compatibilizer (c) comprises: maleic acid, maleic acid anhydride, maleic acid hydrazide, dichloromaleic acid anhydride, unsaturated dicarboxylic acid, fumaric acid, citric acid, citric acid anhydride, malic acid, agaric acid, or a combination thereof.

12. A molded product for vehicles, the product manufactured from an electroconductive polyamide/polyphenylene ether resin composition of claim 1.

13. The composition according to claim 1, wherein the electroconductive filler (d) is heated post production to provide the byproducts in an amount of about 0.1 to about 5 wt % per 100 wt % of electroconductive filler.

14. The composition according to claim 13, wherein the electroconductive filler (d) is heated post production at a temperature of about 950° C. at about 1050° C.

* * * * *